United States Patent [19]
Okada et al.

[11] Patent Number: 5,871,561
[45] Date of Patent: Feb. 16, 1999

[54] METHOD OF TREATING DUSTS CONTAINING OXIDES

[75] Inventors: Yuji Okada; Hirokazu Shirakawa; Masamichi Okada, all of Toyota; Toshikatsu Hara, Nisshin; Hirohiko Sasamoto, Aichi-ken; Kazuhiro Suzuki, Toyota, all of Japan

[73] Assignees: Toyota Jidosha Kabushiki Kaisha, Toyota; Aichi Steel Works, Ltd., Tokai; Toyokin Kabushiki Kaisha, Toyota, all of Japan

[21] Appl. No.: 657,934

[22] Filed: May 30, 1996

[30] Foreign Application Priority Data

May 31, 1995 [JP] Japan ................................. 7-133470
Feb. 21, 1996 [JP] Japan ................................. 8-033284
May 21, 1996 [JP] Japan ................................. 8-125673

[51] Int. Cl.$^6$ ........................ C22B 19/04; C22B 13/00
[52] U.S. Cl. .................... 75/658; 75/324; 75/661; 75/694; 75/695; 75/962
[58] Field of Search ..................... 75/658, 661, 694, 75/695, 962, 324; 266/149

[56] References Cited

U.S. PATENT DOCUMENTS

| | | | |
|---|---|---|---|
| 2,127,632 | 8/1938 | Najarian | ...................................... 75/324 |
| 2,920,951 | 1/1960 | Bretschneider et al. | ............... 75/10.31 |
| 4,227,922 | 10/1980 | Laws et al. . | |
| 5,350,438 | 9/1994 | Okada et al. . | |

FOREIGN PATENT DOCUMENTS 56-10974 3/1981 Japan .

*Primary Examiner*—Melvyn Andrews
*Attorney, Agent, or Firm*—Pillsbury Madison & Sutro LLP

[57] ABSTRACT

Dusts containing zinc and/or lead in the form of oxides and one or more reducing agents are mixed with each other before or after being introduced into a heat treatment furnace. The mixture is heated to a given temperature range under a substantial vacuum so that the zinc and/or lead in the form of oxides are reduced to zinc and/or lead in the state of pure metals and evaporated in the furnace. The evaporated zinc and/or lead are introduced into a retrieving container also under a substantial vacuum and at a given temperature where the evaporated zinc and/or lead pure metals are condensed and retrieved.

13 Claims, 5 Drawing Sheets

METHOD OF TREATING DUSTS CONTAINING OXIDES

BACKGROUND OF THE INVENTION

1. Field of the Invention

The present invention relates to a method and apparatus for treating dusts containing zinc and/or lead in the form of oxides to a retrievable form of their respective pure metals.

2. Description of Related Art

Various industries generate a number of kinds of dusts, some of which contain among other metals zinc and/or lead. For example, steelmaking dusts from electric furnaces usually contain oxides of zinc and/or lead as well as oxides of iron. More particularly, in the automotive industry where steelmaking materials thrown into the electric furnace are car shredder dusts, the dusts generated from the electric furnace will typically contain zinc from automotive steel sheets constructed of galvanized steel sheets, and the dusts will further typically contain lead from car fuel tanks constructed of lead-and-tin-coated steel plates.

In the case of press scraps generated during the manufacture of automobiles, which contain zinc in the form of its substantially pure metal, the zinc can be removed from the galvanized steel sheet scraps by heating the scraps under reduced pressure to cause the zinc to evaporate, as in Japanese Patent Publication No. HEI 4-346681, the disclosure of which is hereby incorporated by reference. However, zinc and/or lead when in the form of oxides rather than their substantially pure metals cannot be retrieved and recycled using the method of Japanese Patent Publication No. HEI 4-346681.

Among other known methods to remove zinc from dusts, there is a method using a rotary kiln where the dusts are heated using a burner and the zinc oxides contained in the dusts are reduced using coke or coal. However, since the dusts have to be heated to extremely high temperatures, this method is disadvantageous in that a large energy cost is necessary and the zinc in the dusts tends to be re-oxidized making it difficult to retrieve the zinc. There is another known method to remove zinc from dusts where the zinc is evaporated at a high temperature generated by a plasma and is retrieved in the form of its pure metal by a Pb splash condenser. However, this method is also disadvantageous in that it tends to cause environmental problems when the method is performed on-site.

Therefore, dusts containing zinc and/or lead are now typically treated by embedding them in the ground so as to satisfy regulations for waste disposal. However, the embedding treatment of dusts is problematic due to the lack of waste sites and the high cost associated with disposal. Further, since all the materials of the dusts are wasted without recycling, in the embedding treatment, the treatment method is not desirable from the viewpoint of material economy.

SUMMARY OF THE INVENTION

An object of the present invention is to provide a method and apparatus for treating dusts containing zinc and/or lead in the form of oxides, wherein the zinc and/or lead can be retrieved in a form of their respective pure metals and thus can be recycled as components for respective metals.

Another object of the present invention is to provide a method and apparatus for treating dust containing zinc and/or lead in the form of oxides to a retrievable form of their respective pure metals, wherein the method and apparatus are efficient in terms of operation, energy cost, time of treatment, and material economy.

A third object of the present invention is to provide a method and apparatus that addresses environmental concerns associated with the treatment, retrieval and disposal of dusts containing metal oxides.

BRIEF DESCRIPTION OF THE DRAWINGS

The above and other objects, features, and advantages of the present invention will become more apparent and will be more readily appreciated from the following detailed description of the present invention in conjunction with the accompanying drawings, of which:

FIG. 5 also shows materials formed in the shape of a briquet in accordance with a method of a fourth embodiment of the present invention;

DETAILED DESCRIPTION OF THE PREFERRED EMBODIMENTS

In the below description, steelmaking dusts generated from electric furnaces are taken as an example of dusts containing oxides. However, dusts containing oxides should not be limited to steelmaking dusts from electric furnaces, and may include, for example, dusts created by the shredding of abandoned automobiles.

Figure 1:
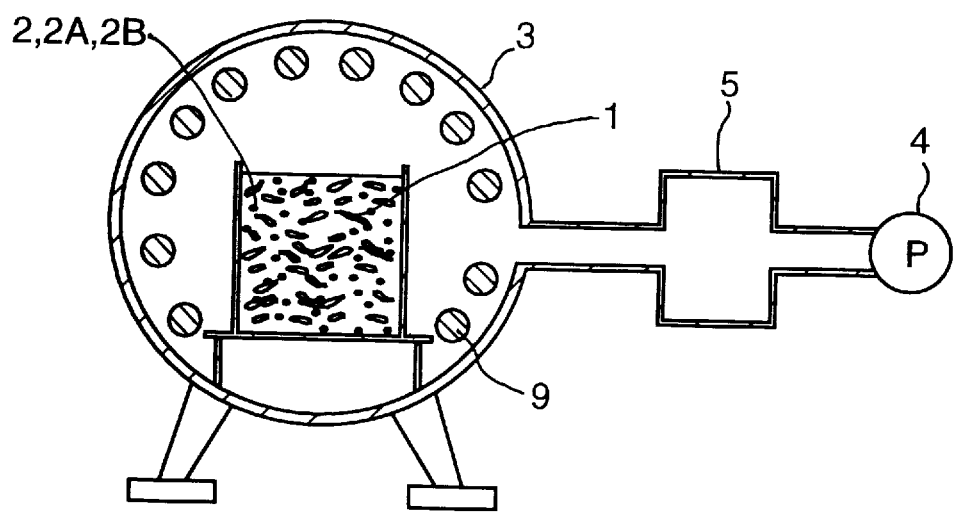
FIG. 1 is a schematic cross-sectional view of an apparatus for conducting methods for treating dusts containing oxides in accordance with a first embodiment and a second embodiment of the present invention.
Figure 2:
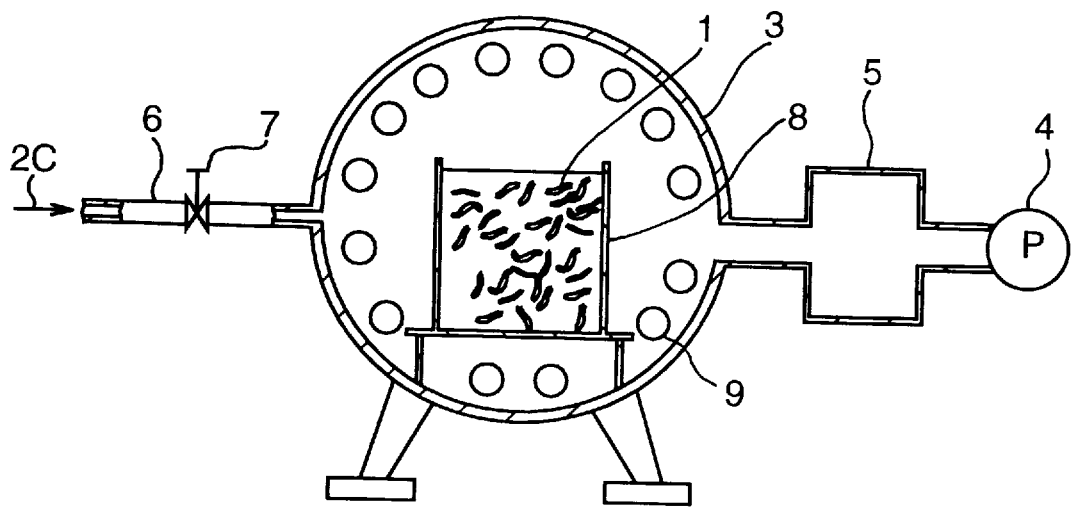
FIG. 2 is a schematic cross-sectional view of an apparatus for conducting a method for treating dusts containing oxides in accordance with a third embodiment of the present invention.
Figure 3:
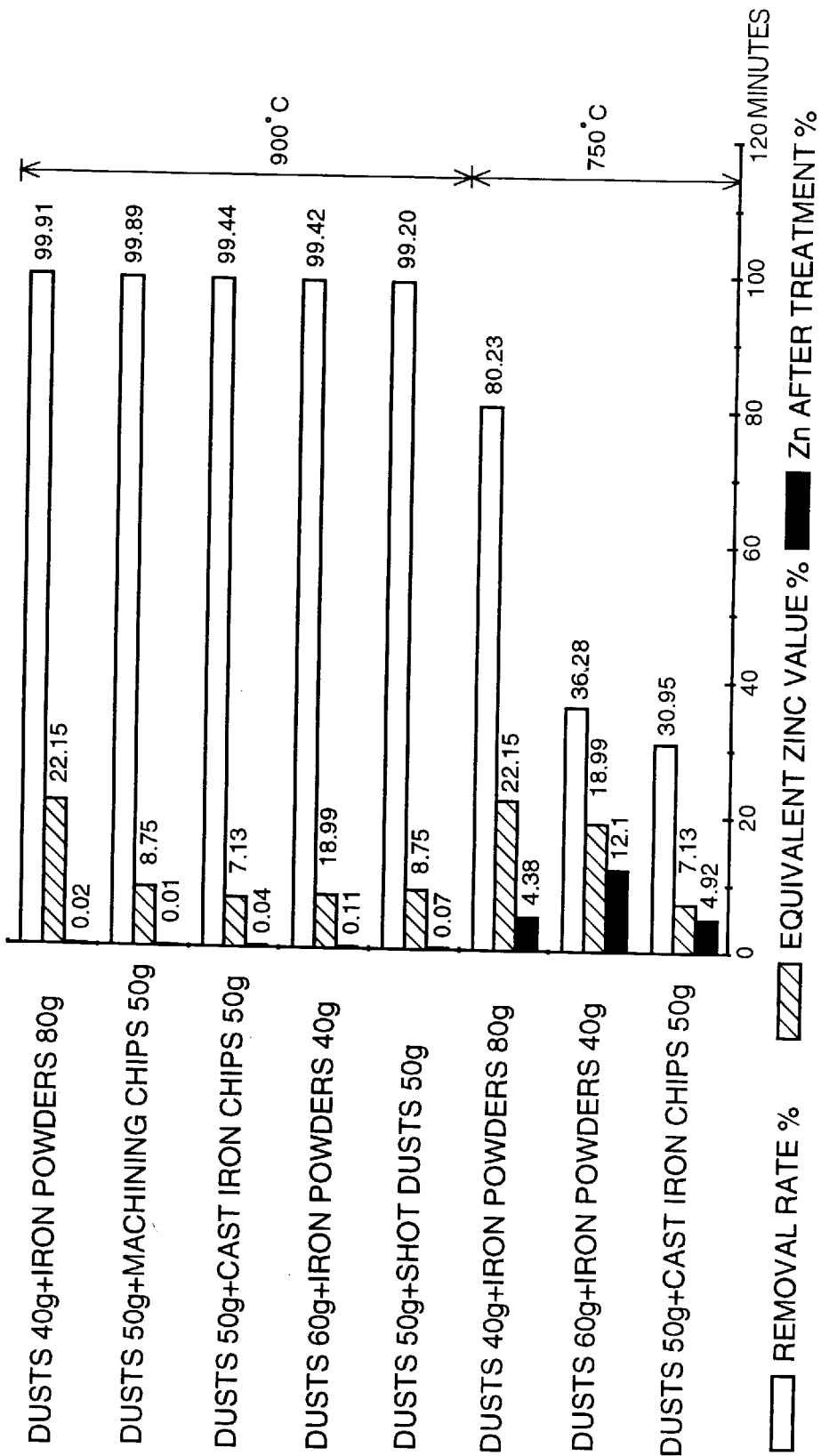
FIG. 3 is a graph showing the results of tests conducted in accordance with the method of the first embodiment of the present invention.
Figure 4:
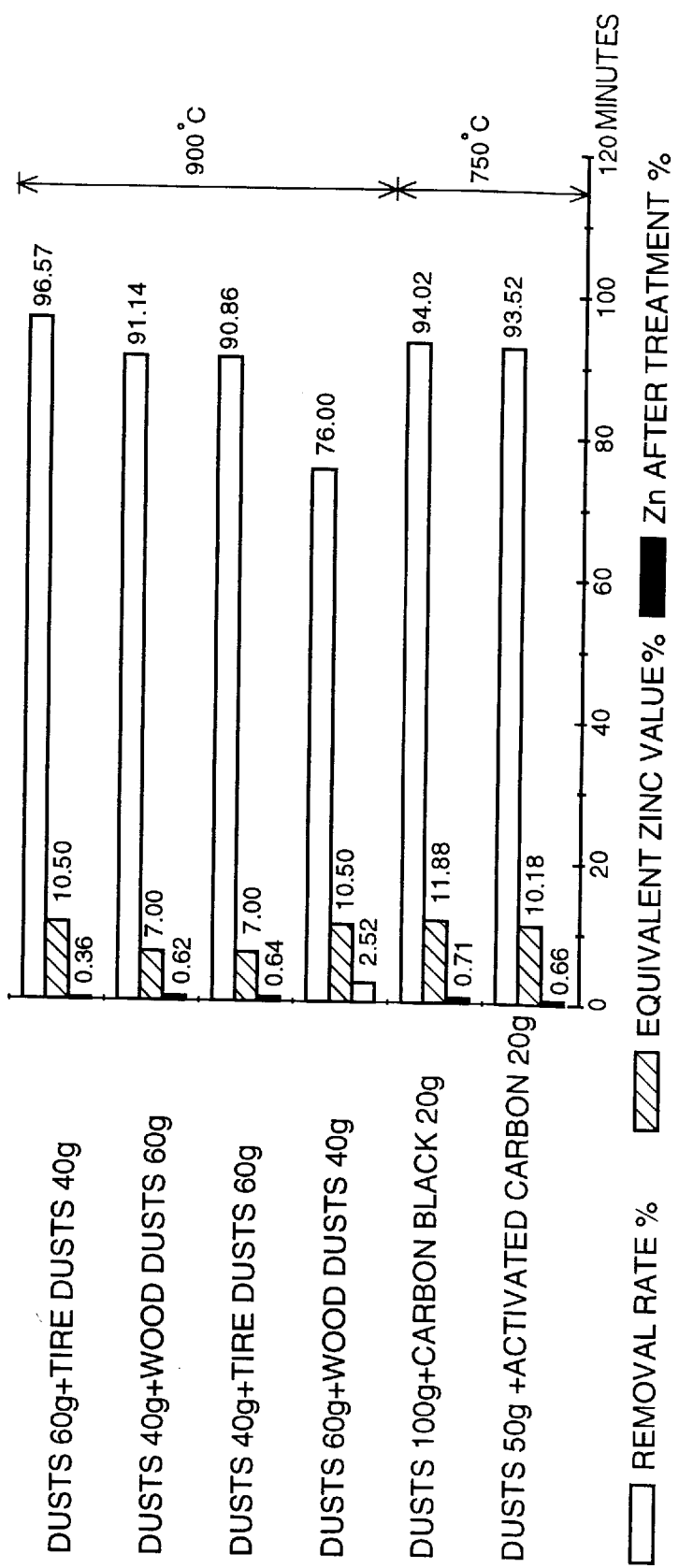
FIG. 4 is a graph showing the results of tests conducted in accordance with the method of the second embodiment of the present invention.
Figure 5:
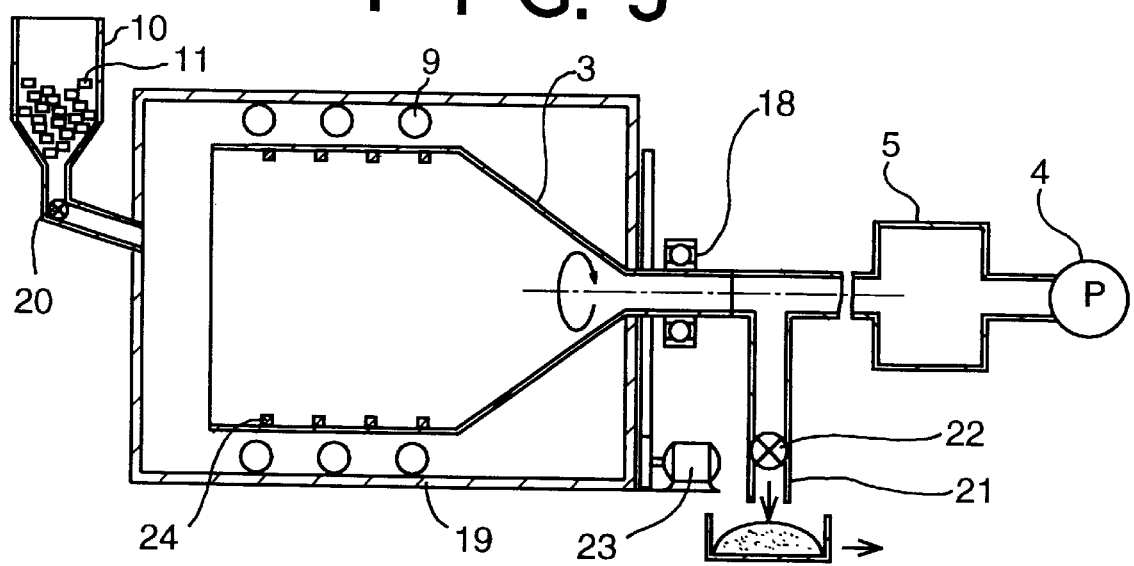
FIG. 5 is a schematic cross-sectional view of an apparatus for treating dusts containing oxides in accordance with a seventh embodiment of the present invention.
Figure 6:
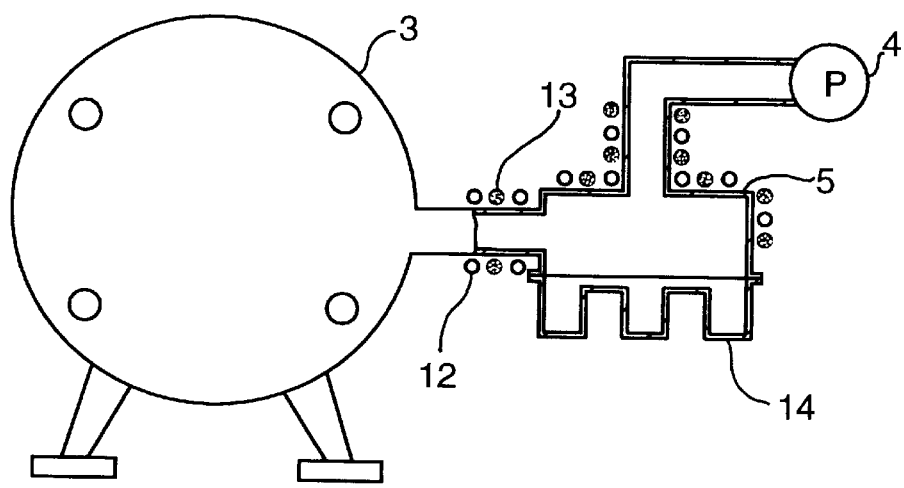
FIG. 6 is a schematic cross-sectional view of an apparatus for conducting a method for treating dusts containing oxides in accordance with a fifth embodiment of the present invention.
Figure 7:
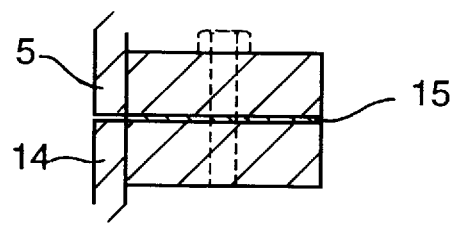
FIG. 7 is an enlarged cross-sectional view of a connecting portion between a retrieving container and an ingot casing of the apparatus of FIG. 6.
Figure 8:
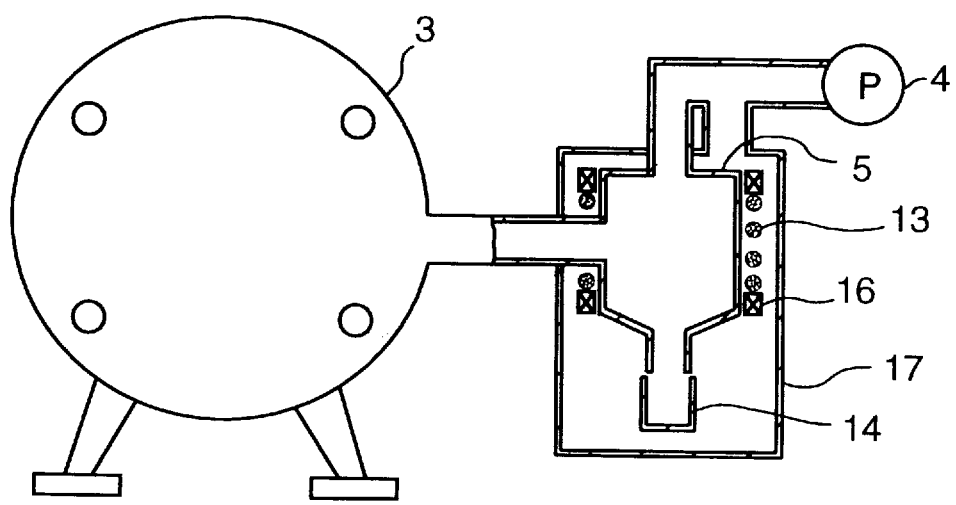
FIG. 8 is a schematic cross-sectional view of an apparatus for conducting a method for treating dusts containing oxides in accordance with a sixth embodiment of the present invention.

FIG. 1 illustrates an apparatus used in a first and second embodiment of the present invention; FIG. 2 illustrates an apparatus used in a third embodiment of the present invention; FIGS. 3 and 4 illustrate results in terms of zinc removal rate before and after treatment with various kinds and amounts of reducing agents used in the method of the first and second embodiments of the present invention, respectively; FIG. 5 illustrates an apparatus used in a seventh embodiment of the present invention and a mixture of dusts containing oxides and reducing agents in the form of a briquet used in a fourth embodiment of the present invention; FIGS. 6 and 7 illustrate an apparatus used to conduct a method for treating dusts containing oxides in a fifth embodiment of the present invention; and FIG. 8 illustrates an apparatus used to conduct a method for treating dusts containing oxides in a sixth embodiment of the present invention. Components common to all of the embodiments of the present invention are denoted with the same reference numerals throughout the description and the drawings of the several embodiments of the present invention.

A description of such components common to all of the embodiments of the present invention will be first explained with reference to, for example, FIG. 1.

A method for treating dusts containing zinc and/or lead in the form of oxides to a retrievable form of their respective pure metals according to the present invention includes the steps of: (1) introducing dusts 1 containing zinc and/or lead, among other metals such as iron as a base, in the form of oxides (for example, steelmaking dusts generated from an electric furnace) and one or more reducing agents 2 into a heat treatment furnace (hereinafter, "furnace") 3; (2) reducing a pressure of an interior of the furnace 3 and heating the interior of the furnace 3 so that the oxides of zinc and/or lead are reduced to their respective pure metals under a substantial vacuum and the zinc and/or lead in the state of their pure metals (boiling points thereof being lower than those of their oxides) are evaporated; and (3) introducing the evaporated zinc and/or lead in the state of their pure metals into a retrieving container 5 communicating with the interior of the furnace 3.

An apparatus for treating dusts containing zinc and/or lead in the form of oxides to a retrievable form of their respective pure metals according to the present invention includes: a heat treatment furnace (hereinafter, "furnace") 3 having an interior; a heater 9 for heating the interior of the furnace 3; means for introducing dusts 1 containing zinc and/or lead, among other metals such as iron, in the form of oxides and one or more reducing agents 2 (which may be integral with or separate from the dusts 1) into the furnace 3; a retrieving container 5 for receiving the pure metals, reduced and evaporated in the furnace 3, and for condensing the pure metals to a retrievable form, which communicates with the interior of the furnace 3, and a vacuum pump 4 communicating with the interior of the furnace 3 and the retrieving container 5 for providing a substantial vacuum therein.

In the instance, for example, where materials thrown into an electric furnace are dusts created by the shredding of abandoned automobiles, the dusts 1 generated from the electric furnace will contain zinc from the outer panels of cars constructed of galvanized steel sheet plates and further will contain lead from fuel tanks (fuel containers) of cars constructed of plates plated with lead and tin. The zinc and lead takes the form of oxides in the dusts.

A composition by weight percent of typical dusts from electric furnaces is shown in the middle row ("Dusts") of TABLE 1.

TABLE 1

| | (%) | | | | | | |
|---|---|---|---|---|---|---|---|
| | Fe | Zn | Mn | Pb | Ca | Al | O |
| Dusts | 17.20 | 14.25 | 3.22 | 2.27 | 12.35 | 1.57 | Bal |
| Vacuum Test | 17.18 | 15.01 | 3.10 | 2.25 | 13.40 | 1.62 | Bal |

As a conventional method for retrieving pure metals (for example, pure zinc) from the dusts of given materials without using a reducing agent, there is a method to treat dusts in a vacuum heat treatment furnace as disclosed in Japanese Patent Publication No. HEI 4-346681. This method was applied to the dusts shown in the above Table 1. The test results are shown in the lowermost row ("Vacuum Test"). In the test, 50 kg of materials were used. With respect to the test conditions, the temperature was at about 850° C., the pressure was at about 0.06 Torr, and the treatment time period was about 6 hours. As will be understood from the test results, for the dusts containing zinc and/or lead in the form of oxides thereof, the composition by weight percent was almost not changed, which means that it is nearly impossible to retrieve zinc and/or lead as a form of pure metal by conventional methods of vacuum heat treatment without the use of a reducing agent.

In contrast, in the treatment method according to the present invention, one or more reducing agents are used to reduce zinc and/or lead in the form of oxides to zinc and/or lead in the form of their respective pure metals. The reducing agent(s) 2 is mixed with the dusts 1 before or after being introduced into the furnace 3. In order that the reducing agent(s) 2 can induce a high level of reduction despite the vacuum condition inside the furnace 3, use of the reducing agents 2 in the form of powders, grains, small pieces, or in the form of gas or liquid is preferable. Further, in order to prevent a reducing agent from invading the vacuum pump and seal, it is preferable to mix the dusts 1 and the reducing agents 2 with each other and then to form the mixture into the form of briquets prior to introduction into the furnace 3.

The furnace 3 is provided with a heater 9. The heater 9 heats the zinc and/or lead by mainly radiation and conduction, which have been reduced from their oxide form in the furnace 3 and are in the state of their pure metals, to a temperature above the boiling points of zinc and/or lead (in general, a temperature in the range of about 600°–1100° C.) under a substantial vacuum. In general, where the reducing agents 2 are solid, a carbon heater may be used for the heater 9, and where the reducing agent is of water or water vapor, a radiant tube-type heater (a heater having a tube in which fuel and gas are injected to form a flame) may be used for the heater 9. The carbon heater does not burn because the heater is located in the vacuum, and the radiant tube-type heater does not react with water and steam.

The vacuum pressure in the furnace 3 should generally be lower than about 10 Torr (1 Torr=1.33322×10$^2$ Pa) so that reduced pure metal does not react with oxygen inside the furnace becoming re-oxidized. Preferably, the pressure is reduced to about 0.06 Torr. It is preferable to hold the dusts in the furnace for a time period longer than about 30 minutes so that the dusts are heated uniformly and the zinc and/or lead are substantially completely evaporated. However, because holding the dusts at high temperatures for too long of a time period will decrease the efficiency of the dust treatment, the time period for holding the dusts at high temperatures should be about 10 hours at longest, and preferably shorter than about 6 hours.

The oxides are reduced and retrieved in the following way in the above method and apparatus. Since the oxides are mixed with the reducing agents 2 and are heated in the furnace under a substantial vacuum (10$^{-2}$~10 Torr), ZnO and PbO in the dusts are reduced by the reducing agents 2 in the vacuum to Zn and Pb, respectively, that is, their pure metals. Though ZnO and PbO have high boiling points and are not evaporated even if they are heated to 1500° C., Zn and Pb in the state of their pure metals have relatively low boiling points, much lower than those of ZnO and PbO, and are evaporated at about 600° C. under a vacuum of about 0.06

Torr. Such a furnace having the ability to generate a vacuum of about 0.06 Torr in the interior of the furnace and to heat an interior of the furnace to at least about 600° C. can be practically manufactured at a reasonable cost.

The evaporated zinc and/or lead in the state or their pure metals are condensed at an inside surface of the retrieving container 5 at about 400° C. or lower and are retrieved in their pure state and recycled in materials for zinc and/or lead with a high purity. An interior of the retrieving container 5 is maintained at a temperature in the range of 100°–500° C. TABLE 2 shows components by weight percent of the material retrieved in a treatment according to the present invention where the steelmaking dusts having the components shown in TABLE 1 were treated by a reducing agent (for example, treated by grinding dusts which were an iron-type reducing agent and then by used automobile tires which were a carbon-type reducing agent). Further, because the steelmaking dusts from which zinc and/or lead have been removed contain a large amount of iron, the dusts can be advantageously recycled as steelmaking materials after the dusts are taken out of the furnace 3.

TABLE 2

| Component | Fe | Zn | Mn | Pb | Ca | Al | O |
|---|---|---|---|---|---|---|---|
| | (%) | | | | | | |
| Retrieved Material | 0.66 | 82.5 | 0.04 | 4.34 | 0.01 | 0.01 | Bal |

The components of the apparatus and method of the present invention unique to several embodiments will be explained by way of following non-restrictive examples.

EXAMPLES

Example 1

In a first embodiment of the present invention, dusts 1 were reduced in the apparatus of FIG. 1 using machining dusts as an iron-type reducing agent 2A. The components by weight percent of the agent 2A are shown in the uppermost row of TABLE 3. The weight ratio of the dusts 1 and the machining dusts was 1:1. As the iron-type reducing agent 2A, powders, grains, and strips of steel, iron oxide (FeO, $Fe_2O_3$), grinding dusts including iron and oxides which do not cause an environmental problem even if heated to a temperature above 900° C., such as $SiO_2$ and MgO, and cast iron also can be used.

In the above treatment method, the following reducing reaction is caused.

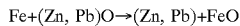

Fe+(Zn, Pb)O→(Zn, Pb)+FeO

According to this reaction, ZnO and PbO are reduced to Zn and Pb in the state of their pure metals, respectively. Since Zn and Pb in the state of their pure metals evaporate at about 600° C. under a vacuum lower than about 10 Torr in pressure, the evaporated metals can be condensed and retrieved by maintaining the temperature of the retrieving container 5 in FIG. 1 at about 400° C. or lower. It is preferable to maintain the temperature of the interior of the furnace 3 in FIG. 1 at about 800° C. or higher, because for practical purposes the reducing reaction becomes too slow at temperatures lower than 800° C.

The steelmaking dusts 1 (original dusts) and the reducing agent 2A were mixed with each other and a test was conducted where the temperature of the furnace 3 was at 900° C., the vacuum was at 1 Torr, and the treatment time period was 2 hours. The components of the dusts remaining in the furnace 3 to which the treatment was applied are shown in TABLE 3 (remaining dusts). As can be seen from the weight percent of the Zn and Pb in the remaining dusts in TABLE 3, it is possible to remove essentially all of the Zn and Pb from the dusts by using iron-type reducing agent.

TABLE 3

| | Fe | Zn | Mn | Pb | Ca | Al | O |
|---|---|---|---|---|---|---|---|
| | (Iron-type Reducing Agent) | | | | | | |
| | (%) | | | | | | |
| Machining Dusts | 90.30 | 0.00 | 0.77 | 0.09 | 0.60 | 0.07 | Bal |
| Original Dusts | 17.20 | 14.25 | 3.22 | 2.27 | 12.35 | 1.57 | Bal |
| Remaining Dusts | 68.10 | 0.04 | 2.12 | 0.27 | 6.14 | 0.74 | Bal |

FIG. 3 illustrates the ratio of Zn to steelmaking dusts after and before treatment and the Zn removal rate when the kind of iron-type reducing agent, treatment temperature, and mixing ratio of the reducing agent and the dusts were variously changed and tested. However, for all the tests of FIG. 3 the treatment time period was 2 hours and the vacuum degree was at 1 Torr.

As shown in FIG. 3: (1) in the case where 40 g of dusts and 80 g of iron powders were mixed and treated at 900° C., the Zn removal rate was 99.91%; (2) in the case where 50 g of dusts and 50 g of machining chips were mixed and treated at 900° C., the Zn removal rate was 99.89%; (3) in the case where 50 g of dusts and 50 g of cast iron chips were mixed and treated at 900° C., the Zn removal rate was 99.44%; (4) in the case where 60 g of dusts and 40 g of iron powders were mixed and treated at 900° C., the Zn removal rate was 99.42%; (5) in the case where 50 g of dusts and 50 g of shot dusts were mixed and treated at 900° C., the Zn removal rate was 99.20%; (6) in the case where 40 g of dusts and 80 g of iron powders were mixed and treated at 750° C., the Zn removal rate was 80.23%; (7) in the case where 60 g of dusts and 40 g of iron powders were mixed and treated at 750° C., the Zn removal rate was 36.28%; and (8) in the case where 50 g of dusts and 50 g of cast iron chips were mixed and treated at 750° C., the Zn removal rate was 30.95%. From the test results, it is seen that iron powders, machining dusts, and shot dusts are preferable as the iron-type reducing agents.

As seen from FIG. 3, with various kinds of reducing agents used in the method of the present invention, a Zn removal rate higher than 90% is possible by selecting appropriate treatment conditions. More particularly, in the case of iron-type reducing agents, treatment at temperatures lower than 750° C. tends to lower the Zn removal rate. Therefore, treatment at higher temperatures (more particularly, at 800° C. or higher) is desirable.

In the method according to the first embodiment of the present invention, machining dusts, grinder dusts and cast iron dusts which have been typically wasted in the past can be used as reducing agents and will remain in the remaining dusts to be recycled as steelmaking materials.

Example 2

In a second embodiment of the present invention, dusts 1 were reduced in the apparatus of FIG. 1 using grains of activated carbon (including 99% or more carbon) as a carbon-type reducing agent 2B. The weight ratio of the dusts 1 and the grains of activated carbon was 1:1.

In the above treatment method, the following reducing reaction is caused.

$C + (Zn, Pb)O \rightarrow (Zn, Pb) + CO$ $CO + (Zn, Pb)O \rightarrow (Zn, Pb) + CO_2$ According to this reaction, ZnO and PbO are reduced to Zn and Pb in the state of their pure metals, respectively. Since Zn and Pb in the state of their pure metals evaporate at about 600° C. under a vacuum lower than about 10 Torr in pressure, the evaporated metals can be condensed and retrieved by maintaining the temperature of the retrieving container 5 in FIG. 1 at about 400° C. or lower. It is preferable to maintain the temperature of the interior of the furnace 3 in FIG. 1 at about 700° C. or higher, because for practical purposes the reduction reaction becomes too slow at temperatures lower than 700° C.

The dusts 1 (original dusts) and the reducing agent 2B were mixed with each other and a test was conducted where the temperature of the furnace 3 was at 750° C., the vacuum was at 0.15 Torr, and the treatment time period was 6 hours. The components of the dusts remaining in the furnace 3 to which the treatment was applied are shown in TABLE 4 (remaining dusts). As can be seen from the weight percent of the Zn and Pb in the remaining dusts in TABLE 4, it is possible to remove essentially all of the Zn and Pb from the dusts by the method of the present invention using carbon-type reducing agents.

TABLE 4

(Carbon-type Reducing Agent)

| | (%) | | | | | | |
|---|---|---|---|---|---|---|---|
| | Fe | Zn | Mn | Pb | Ca | Al | O |
| Original Dusts | 17.20 | 14.25 | 3.22 | 2.27 | 12.35 | 1.57 | Bal |
| Remaining Dusts | 23.20 | 0.66 | 4.21 | 0.44 | 15.80 | 1.94 | Bal |

For a carbon-type reducing agent 2B, reducing agents of carbon black, sawdusts, wood chips, used tires, and activated carbon are suitable.

FIG. 4 illustrates the ratio of Zn to steelmaking dusts after and before treatment and the Zn removal rate when the kind of carbon-type reducing agent, treatment temperature, and mixing ratio of the reducing agent and the dusts were variously changed and tested. However, for all the tests of FIG. 4 the treatment time period was 2 hours and the vacuum degree was at 1 Torr.

As shown in FIG. 4 and TABLE 5 (corresponding to the example shown in the uppermost row of FIG. 4): (1) in the case where 60 g of dusts and 40 g of tire dusts were mixed and treated at 900° C., the Zn removal rate was 96.57%; (2) in the case where 40 g of dusts and 60 g of wood dusts were mixed and treated at 900° C., the Zn removal rate was 91.14%; (3) in the case where 40 g of dusts and 60 g of tire dusts were mixed and treated at 900° C., the Zn removal rate was 90.86%; (4) in the case where 60 g of dusts and 40 g of wood dusts were mixed and treated at 900° C., the Zn removal rate was 76.00%; (5) in the case where 100 g of dusts and 20 g of carbon black were mixed and treated at 750° C., the Zn removal rate was 94.02%; (6) in the case where 50 g of dusts and 20 g of activated carbon were mixed and treated at 750° C., the Zn removal rate was 93.52%. From the test results, it is seen that the tire dusts, wood dusts, and activated carbon are suitable as the carbon-type reducing agent.

TABLE 5

| Reducing Agent | Mixing Ratio (Dusts: Reducing Agent) | Treatment Temperature (°C.) | (%) Zn Content (wt %) | | Removal Rate |
|---|---|---|---|---|---|
| | | | Before Treatment | After Treatment | |
| Tire | 6:4 | 900 | 10.50 | 0.36 | 96.57 |

As seen from FIG. 4, with various kinds of reducing agents used in the method of the present invention, it is possible to obtain a Zn removal rate higher than 90% by selecting appropriate treatment conditions. These carbon-type reducing agents which were wasted in the past without recycling can be used as a reducing agent in the method according to the second embodiment of the present invention, with large economical and material saving merits obtained.

Example 3

In a third embodiment of the present invention, as illustrated in FIG. 2, water or water vapor is used as a reducing agent 2C. In this case, to prevent the water or water vapor from reacting with the heater 9, a radiant tube-type heater is used. The water or water vapor is supplied to the furnace 3 through injection pipe 6 in which a valve 7 is installed.

A test was conducted where steelmaking dusts 1 were put into a furnace 3 having a capacity for treating 300 kg of dusts 1 using a metal bucket 8. The interior of the furnace was reduced in pressure using a vacuum pump 4 and was heated by a radiant tube-type heater 9. In the test, the temperature inside the furnace 3 was raised to about 850° C. and the pressure was reduced to 0.06 Torr. Then, water 2C was injected into the furnace 3 at the rate of 3 cc of water per 100 g of dusts and the pressure was returned to 1 Torr. Then, the pressure inside the furnace 3 was again reduced to 0.06 Torr, and then the interior of the furnace 3 was returned to room temperature and atmospheric pressure. It took six hours to conduct the above cycle.

Test results for the above cycle are shown in TABLE 6. From the test results, it can be seen that the Zn and Pb contained in the original dusts in the form of oxides were reduced, evaporated and removed in the significant amounts from the remaining dusts using the water as a reducing agent, and that the Zn and Pb in the state of their pure metals could be condensed and retrieved with substantial purity in the retrieving container 5.

Obtainment of water is easy, and water reacts with carbon to cause CO, which thereby enhances the reducing effect.

TABLE 6

(Reducing Agent is Water)

| | (%) | | | | | | |
|---|---|---|---|---|---|---|---|
| | Fe | Zn | Mn | Pb | Ca | Al | O |
| Original Dusts | 31.23 | 18.99 | 2.39 | 2.11 | 3.67 | 0.67 | Bal |
| Remaining Dusts | 48.22 | 2.31 | 3.66 | 0.25 | 5.48 | 1.04 | <20 |
| Retreived Metals | — | 86.5 | <0.1 | 12.0 | <0.1 | <0.1 | <0.1 |

Example 4

In a fourth embodiment of the present invention, as illustrated in FIG. 5, dusts containing zinc and/or lead in the form of oxides and one or more reducing agents are mixed with each other and the mixture is formed into briquets 11, before they are put into a furnace 3 through a hopper 10. Since an individual grain of the steelmaking dusts is typically of a size smaller than 1 mm in diameter, namely, a powder, conveyance by a conventional truck is inappropriate for the dusts. Therefore, it is necessary that the dusts be conveyed by a particular truck, which increases the conveyance cost. Further, the powder-like dusts adhere to the seal surfaces of the vacuum furnace and vacuum pump causing seal trouble for the furnace and pump and operational trouble for the pump. However, when the dusts and reducing agents are formed into briquets prior to being introduced into the furnace, these problems are solved. In this connection, to solve the conveyance problem, the dusts have to be formed into briquets at the factory where the dusts are generated. In the case where the briquets are formed by pressing, the dusts and the reducing agents contact each other at a high contact rate so that a stable reaction can be obtained.

With respect to methods for forming the dusts and the reducing agents into the form of briquets, when a press machine is available, preferably the press machine is used. When a press machine is not available, some binder is added to the mixture of the dusts and the reducing agents and the mixture is formed into briquets. Such binder should be added to the mixture of the dusts and the reducing agents by about 5–15% of the mixture by volume. If less than about 5%, formation of the briquets will be difficult, and if greater than about 15%, the strength of the briquets will be too low when the binder is evaporated. As examples of the binder, starch and bentonite are preferable, and organic material, such as phenol and furan, and water glass can be used, among others. Starch and bentonite will cause no problem even if they are evaporated during treating. However, since organic material may cause smoke or odor when heated, a ventilation system may need to be provided to the treatment plant.

Example 5

In a fifth embodiment of the present invention, as illustrated in FIGS. 6 and 7, zinc and/or lead which have been reduced and evaporated in the furnace 3, are melted in a retrieving container 5 reduced in pressure to a substantial vacuum, and then condensed in an ingot casing to an ingot. This is because the pure metals of Zn and/or Pb retrieved in the form of an ingot are convenient for handling.

The retrieving container 5 of FIG. 6 is provided on the exterior surface with heaters 12 and cooling pipes 13 in which water flows so that the interior temperature of the retrieving container 5 is controllable. The ingot casing 14 communicates with and is disposed below the retrieving container 5. The ingot casing 14 and the retrieving container 5 are coupled by flanges between which a metal gasket 15 is interposed as shown in FIG. 7. The zinc and/or lead evaporated in the furnace 3 are received by the retrieving container 5, where the evaporated zinc and/or lead are melted (in a case where the evaporated zinc and/or lead have already condensed, the condensed metals are remelted) in the retrieving container 5 by controlling the temperature of the interior of the retrieving container 5 to a temperature in the range of about 100° to 500° C., and then the melted pure metals of zinc and/or lead drop into the ingot casing 14 where the metals are condensed to an ingot form.

Example 6

In a sixth embodiment of the present invention, as illustrated in FIG. 8, zinc and/or lead which have been reduced and evaporated in a furnace 3 are melted in a retrieving container 5, and then condensed to an ingot form for convenience for handling, as explained in accordance with the fifth embodiment of the present invention.

In this embodiment, the retrieving container 5 of FIG. 8 is provided on the exterior surface with high frequency coils 16 and cooling pipes 13 in which water flows so that the interior temperature of the retrieving container 5 is controllable. At a bottom open portion of the retrieving container 5, an ingot casing 14 is disposed. The upper portion of the ingot casing 14 is open to the bottom open portion of the retrieving container 5, but is separated therefrom. Both of the retrieving container 5 and the ingot casing 14 are housed in a vacuum casing 17 which is reduced in pressure by vacuum pump 4 to a substantial vacuum. As a result, air does not flow into the retrieving container 5, the furnace 3 and the ingot casing 14, and reoxidation of the reduced zinc and/or lead does not occur.

The reduced zinc and/or lead evaporated in the furnace 3 are received by the retrieving container 5, where the evaporated zinc and/or lead are melted in the retrieving container 5 by controlling the temperature of the interior of the retrieving container 5 to a temperature in the range of about 100° to 500° C. Then, the melted pure metals of zinc and/or lead drop into the ingot casing 14 where the zinc and/or lead are condensed to an ingot form.

Example 7

In a seventh embodiment of the present invention, as illustrated in FIG. 5, the furnace 3 is constructed with one end open to hopper 10 and is rotatably supported by bearings 18. The furnace 3 is rotatable about a central axis essentially perpendicular the open end thereof. When the furnace 3 is rotated, dusts and reducing agents introduced into the furnace 3 are agitated so that the materials are well mixed and are heated uniformly in a relatively short period of time. The furnace 3 is housed in an adiabatic casing 19 and is heated from the exterior of the furnace 3 by heaters 9 disposed within the casing 19 to a temperature in the range of about 600° C. to about 1100° C., preferably above 700° C. FIG. 5 further depicts briquets 11 formed from a mixture of dusts and reducing agents according to the method described in Example 4. The briquets are introduced into the furnace 3 through a duct penetrating the adiabatic casing 19, when a valve 20 provided at the bottom of the hopper 10 is open. The interior of the adiabatic casing 19 and the interior of the retrieving container 5 are capable of being reduced in pressure to a substantial vacuum (in general, to a pressure lower than about 10 Torr) by a vacuum pump 4. More particularly, when the temperature of the interior of the furnace is at about 700° C., the pressure is below about $10^{-2}$ Torr, and when the pressure is at 10 Torr, the temperature is preferable to be above about 900° C.

The furnace 3 is rotated by a driving mechanism 23. Rotation of the furnace 3 is preferably an intermittent rotation so that the rotational speed of the furnace 3 can be controlled to a slow speed. This is because if the rotational speed of the furnace is too fast, i.e., in the case of non-briquet dusts mixed with reducing agents, the reducing agent(s) tends to come to the surface of the dusts due to gravity differences and only the reducing agent(s) will react. Preferably, the furnace is rotated at a speed of a quarter rotation per 15 minutes. At this speed sufficient mixing is obtained and the reducing agents are prevented from coming to the surface of the dusts. The furnace is preferably rotated about two or three rotations per treatment.

A spiral fin 24 is provided at a cylindrical inside surface of the furnace 3 so that the fin can convey the dusts and reducing agents inside the furnace toward an exit side end, communicating with the retrieving container 5, when the furnace is rotated. Due to the rotatable structure of the furnace and the conveyance mechanism by the fin, continuous treatment of material by the furnace is possible.

An exit passage 21 is connected to a passage connecting the exit side end of the furnace 3 and the retrieving container 5. A valve 22 is provided in the passage 21. Opening the valve 22, the remaining dusts from which the zinc and/or lead have been reduced and evaporated are taken out from the furnace 3 through the passage 21. The remaining dusts include much iron and are recycled as an iron source. Zinc and/or lead in the state of their pure metals are retrieved in the retrieving container 5 according to the foregoing description.

Though steelmaking dusts are taken as the example of dusts in the above description of the several embodiments of the present invention, it is to be understood that the present invention can be applied to other dusts, for example, slag generated from a melting furnace, dusts from the shredding of abandoned cars, and other industrial wastes including heavy metals, as well as to the treatment of cement materials.

According to the method and apparatus of the present invention, the following advantages are obtained:

First, since dusts containing oxides of zinc and/or lead are mixed with one or more reducing agents and heated under a substantial vacuum, zinc and/or lead is reduced and retrieved in the state of their pure metals, so that almost all of the zinc and /or lead initially contained in the dusts can be retrieved and recycled.

Second, in the case where a mixture of the dusts and the one or more reducing agents is formed into briquets before introduction into the furnace, invasion of powder-like dusts into the vacuum pump and seal structure is prevented.

Third, in the case where the retrieved pure metals are melted in the retrieving container and then condensed in an ingot casing, the metals can be recycled in the form of an ingot for ease of handling.

Fourth, in the case where the retrieved pure metals are removed from the retrieving container to the ingot casing in a vacuum, reoxidation of the retrieved metals is prevented.

Fifth, in the case where means for rotating the furnace are provided, a continuous treatment of dusts is possible.

Sixth, in the case where means for rotating the furnace intermittently are provided, separation of the one or more reducing agents from the dusts is prevented.

Although the present invention has been described with reference to specific exemplary embodiments, it will be appreciated by those skilled in the art that various modifications and alterations can be made to the particular embodiments of the apparatus and method described and depicted without materially departing from the novel teachings and advantages of the present invention. Accordingly, it is to be understood that all such modifications and alterations are included within the spirit and scope of the present invention as defined by the following claims.

What is claimed is:

1. A method for treating dusts containing zinc and/or lead in the form of oxides to a retrievable form of their respective pure metals, comprising the following steps of:

introducing the dusts and one or more reducing agents into a heat treatment furnace;

reducing an interior of said heat treatment furnace to a pressure equal to or less than 1 Torr and heating said interior of said heat treatment furnace so that said oxides of zinc and/or lead are reduced to said respective pure metals and said respective pure metals are evaporated; and introducing said evaporated respective pure metals into a retrieving container communicating with said interior of said heat treatment furnace and condensing said evaporated respective pure metals to said retrievable form.

2. A method according to claim 1, wherein said one or more reducing agents include an iron based reducing agent.

3. A method according to claim 2, wherein said iron based reducing agent includes a member selected from the group consisting of iron powders, iron machining dusts, cast iron dusts, and iron shot dusts.

4. A method according to claim 1, wherein said one or more reducing agents include a carbon based reducing agent.

5. A method according to claim 4, wherein said carbon based reducing agent includes a reducing agent selected from the group composed of tire dusts, wood dusts, carbon black, and activated carbon.

6. A method according to claim 1, wherein said one or more reducing agents include at least one of water and water vapor.

7. A method according to claim 2, wherein said interior of said heat treatment furnace is heated to a temperature above 800° C. during said heating step.

8. A method according to claim 4, wherein said interior of said heat treatment furnace is heated to a temperature above 700° C. during said heating step.

9. A method according to claim 1, wherein said pressure of said interior of said heat treatment furnace is reduced to about 0.06 Torr during-said pressure reducing step.

10. A method according to claim 1, wherein said dusts are maintained at a temperature in a range of 600° to 1100° C. for a time period of 30 minutes to 10 hours.

11. A method according to claim 1, wherein said dusts and said one or more reducing agents are mixed with each other and formed in the form of a briquet before being introduced into said heat treatment furnace.

12. A method according to claim 1, further comprising the steps of:

melting said condensed respective pure metals in said retrieving container under a substantial vacuum;

transferring said melted respective pure metals to an ingot formation casing disposed at a bottom open portion of said retrieving container; and cooling said melted respective pure metals in said ingot formation casing to said retrievable form.

13. A method according to claim 12, wherein said cooling occurs in said ingot formation casing while communicating with said retrieving container and said respective pure metals transfer from said retrieving container to said ingot formation casing under a substantial vacuum.

* * * * *